United States Patent [19]

King

[11] 4,326,775
[45] Apr. 27, 1982

[54] METHOD FOR OPERATING A PANORAMIC OPTICAL SYSTEM

[76] Inventor: Don G. King, 1031 Shadow Wood, Lewisville, Tex. 75067

[21] Appl. No.: 157,865

[22] Filed: Jun. 9, 1980

Related U.S. Application Data

[63] Continuation-in-part of Ser. No. 10,076, Feb. 7, 1979, abandoned, which is a continuation of Ser. No. 822,402, Aug. 8, 1977, abandoned.

[51] Int. Cl.³ .......................... G02B 5/10; G02B 27/18
[52] U.S. Cl. .................................... 350/320; 350/293; 350/441
[58] Field of Search ............... 350/320, 293, 441, 442, 350/21, 27; 354/95

[56] References Cited

U.S. PATENT DOCUMENTS

| | | | |
|---|---|---|---|
| 1,653,575 | 12/1927 | Kirtane | 350/441 |
| 2,176,554 | 10/1939 | Hardy | 350/441 |
| 2,244,235 | 6/1941 | Ayres | 350/293 |
| 2,299,682 | 10/1942 | Conant | 350/442 |
| 3,209,073 | 9/1965 | Falbel | 350/441 |
| 3,846,809 | 11/1974 | Pinzone et al. | 350/441 |

FOREIGN PATENT DOCUMENTS 1155544  6/1969  United Kingdom ................ 350/441

*Primary Examiner*—Jon W. Henry
*Attorney, Agent, or Firm*—Hubbard, Thurman, Turner, Tucker & Glaser

[57] ABSTRACT

A method for operating a panoramic optical system to produce a shadow or darkened zone on the apex of a curved lens in order to eliminate undesirable optical interference in the region between the curved reflector and the focal plane is disclosed. The claimed method makes possible the accurate prediction of the diameter of the darkened zone around which the reflected image is annularly disposed, for a lens having a reflective surface of a given radius of curvature and for a specific location of the transparent/opaque border relative to the top of the lens. This makes possible the calibration of vertical displacement of an opaque sleeve for quickly and easily establishing a setting which will produce a darkened zone of a standard diameter.

1 Claim, 4 Drawing Figures

METHOD FOR OPERATING A PANORAMIC OPTICAL SYSTEM

This is a continuation-in-part of application Ser. No. 010,076, filed Feb. 7, 1979, now abandoned, which was a continuation of application Ser. No. 822,402, filed Aug. 8, 1977, now abandoned.

This invention relates to optical systems, more particularly to panoramic optical systems, and specifically to panoramic optical recorders of the type having a reflector defined by a curved surface having an axis transverse to the focal plane.

There are many applications where it is desirable to project and record images disposed substantially 360° around the camera or other recording device. Historically, this objective has been accomplished with either multiple viewers which then project the images received by a viewer on a segmented screen or the like or with the use of a single viewer which is mounted for rotation through the desired angle. Among the difficulties with the former approach is the continuing problem of picture overlap on the segmented screens; or, in the latter case, with the complexity and expense of equipment necessary to produce the final image.

To overcome the aforementioned difficulties and problems, there has been prior, but limited, research and development into recorders and projectors which utilize, as the heart of these systems, a single optical lens or reflector having an outer circumscribing surface of revolution, the axis of which is concentric with the viewing axis and thus perpendicular to the film or focal plane. The outer surface of such lens is typically coated with reflective material and the incoming rays (defining the optical information) disposed 360° around the reflector are imaged in the form of an annulus at the film or focal plane. Typical examples of these prior art systems are shown and described in U.S. Pat. Nos. 1,653,575 to Kirtane; 2,176,554 to Hardy; 3,209,073 to Falbel; and 3,846,809 to Pinzone et al, which patents are believed to be representative of the closest known art relative to this invention.

While these prior art systems theoretically accomplished the desired objective, they have relatively limited practical use since they lack those functional and structural features necessary to achieve the desired freedom of distortion and interference required to realize their commercial potential. Specifically, existing designs of the aforementioned type of panoramic recorders are inherently susceptible to image distortion and washout due to light ray interference occurring between the reflector lens and the focal plane, as well as difficulty in effectively focusing the image on the focal plane.

It is, therefore, the principal object of the present invention to provide a new and improved lens system for a panoramic optical recorder or the like.

Another object of the invention is to provide a new improved panoramic optical system for use in recording and projecting images throughout a full 360°.

Yet another object of the invention is to provide a new and improved means for eliminating undesirable light ray interference and providing ease of focusing and adjustability in a panoramic recorder or projector of the type including a reflector lens having a surface of revolution which axis is substantially perpendicular to the film or focal plane.

In accordance with these and other objects, the present invention is directed to a method for operating a panoramic optical system of the aforementioned type whereby a nonreflective zone is created by projecting a shadow on the lens base by an appropriately positioned outer opaque sleeve. In accordance with an alternate embodiment, the nonreflective zone is provided by making the base of the reflector lens black or opaque.

Specific features of the invention, as well as additional objects and advantages thereof, will become more readily understood from the following detailed description, taken in conjunction with the accompanying drawings, wherein.

The drawings are not necessarily to scale and in some instances portions have been exaggerated in order to emphasize particular features of the invention.

Figure 1:
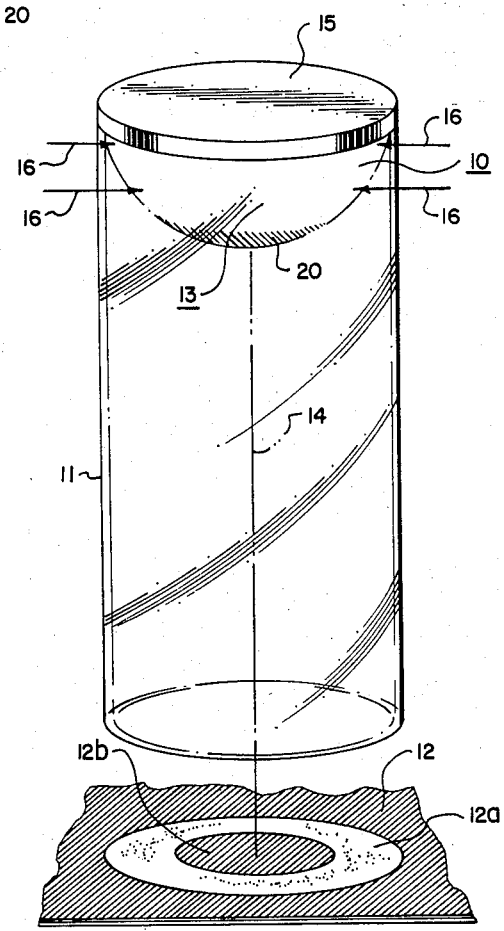
FIG. 1 is a perspective view of the optical system of the present invention in accordance with a first preferred embodiment thereof.

Referring initially to FIG. 1, a preferred embodiment of the panoramic optical system of the present invention includes a reflector lens 10 mountably supported within the confines of a cylindrical support member 11 and disposed (by means not shown) above the surface 12 upon which the resulting image is projected. Depending upon the particular application involved, the surface 12 may be, for example, the unexposed film of a conventional camera or, alternatively, the face of a television camera tube. In essence, therefore, the surface 12 defines the focal plane upon which the image collected by the reflector lens 10 is focused.

The lens 10, in its broadest sense, has a curved outer surface 13, and an axis 14 of symmetry which is transverse to the focal plane 12. Thus, the reflector 10 may be of a wide variety of complex configurations, and the outer surface, although symmetrical about the axis 14, can be convex or concave and may be, for example, of a conical or frustoconical design. In the preferred embodiment depicted in FIG. 1, however, the reflector 10 is of a hemispherical configuration of complex curvature with the outer surface 13 being of a reflective material, an opaque disc 15 optionally provided at the top thereof.

The reflector lens 10 is effective to reflect light rays 16 impinging on the entire 360° surface 13 and reflect the light rays downwardly through the support 11 onto the surface 12, the resulting reflected image being reproduced within the area defined by the circle 12a. Accordingly, and in this embodiment, the cylindrical sleeve 11 is entirely transparent to enable the desired collection of the light rays by the reflector 10.

Figure 2:
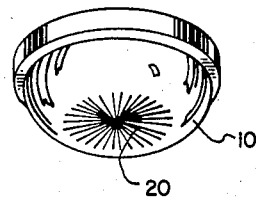
FIG. 2 is a perspective view of the base of the reflector lens depicted in FIG. 1.

In accordance with a unique feature of the present invention, and with additional reference to FIG. 2, the base portion 20 of the reflector lens 10 is blackened or made opaque in order to prevent light waves impinging on the portion from being reflected back to the focal plane 12, thus resulting in a central or "dead" zone 12b around which the resulting image is annularly disposed (within zone 12a).

The principal purpose for providing the blackened portion 20 is to eliminate undesirable light ray interference in the area between the reflector 10 and the focal plane 12. Thus, the surface area which is blackened is that area which, unless made nonreflective, would reflect light rays inside the sleeve 11 back to the film plane 12 and cause overexposure and washout of the resulting image.

Figure 4:
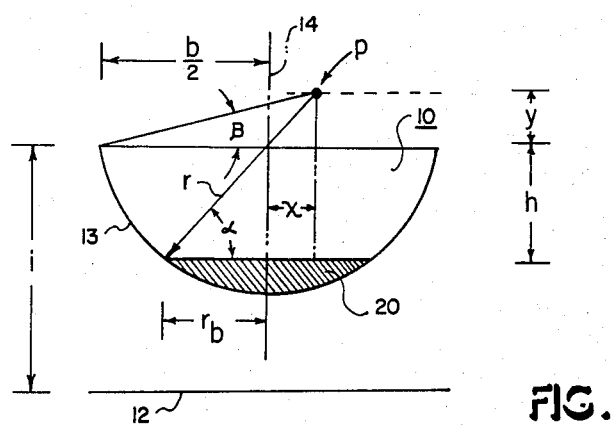
FIG. 4 is a diagram illustrating the method for computing the location of the blackened zone at the base of the reflector lens.

Referring now to FIG. 4, the method and formula for computing the location and extent of the blackened zone 20 is now described. Accordingly, where $r_b$ is defined as the lateral distance of the zone 20 from the central reflector axis 14 and h is defined as the distance from the top of the reflector lens to the upper boundary of the dead zone 20, the desired location h of the interface of zone 20 has been found to be determined by the following formulae:

$h = r \sin(\alpha) - y$ where r = the radius of curvature of the curved surface 13 at the boundary of zone 20

$r_b = r \cos(\alpha) - x$ p = origin of curvature of the curved surface 13 at the boundary of zone 20 x, y = coordinates of p $$x = \frac{r_b y}{h}$$

$$y = \left(x + \frac{b}{2}\right) \tan \beta$$

$\alpha = \arctan y/x$ $$\beta = \text{tilt angle} = \arctan\left(\frac{y}{x + \frac{b}{2}}\right)$$

b = diameter of reflector lens top surface i = vertical distance from top of reflector lens to film plane 12

For a given lens 10, the curvature of the reflective surface 13 will be known, and the coordinates x, y of the origin of curvature p for any given point on the reflective surface 13 can be determined, either by calculation or by reference to a previously prepared chart. The remaining parameters (eg. $\alpha$, $\beta$, r) can likewise be calculated, whereby the value of h can be easily determined for a specified value of $r_b$.

Figure 3:
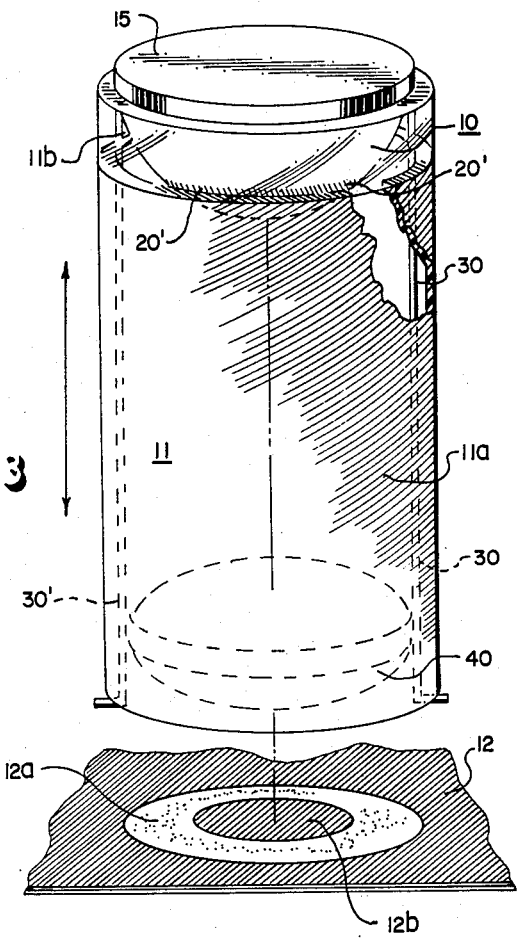
FIG. 3 is a perspective view of the optical system of the present invention in accordance with an alternate embodiment thereof.

Referring now to FIG. 3, the preferred embodiment of the present invention is now described. Accordingly, as before, the optical recorder includes the reflector lens 10 supported by the axially extending support sleeve 11 through which the collected light rays are reflected to generate the image within the area 12a on the film or focal plane 12. In this embodiment, however, the cylindrical sleeve 11 includes a lower opaque surface 11a adjacent an upper transparent portion 11b. Thus, and in lieu of coating or treating the base portion of the reflector lens to make it nonreflective, the outer sleeve 11 can be vertically translated (as, for example, along guides 30) with respect to the reflector lens 10 to effectively prevent impingement of light rays upon the lower portion (herein designated 20'), thus essentially "blackening" or creating a shadow over this base portion to the same extent and for the same purpose previously described with respect to the embodiment in FIG. 1. The desired location h of the interface of zone 20' can be calculated by the formulae disclosed above. The location h in this instance is the vertical displacement of the top of the opaque surface 11a relative to the top of the lens 10.

An additional advantage inherent in the embodiment of FIG. 3 is that the effective area 20' which can be darkened can be conveniently varied by merely adjusting the relative vertical relationship between the sleeve 11 and the lens 10. If desired, and as shown in FIG. 3, a suitable objective lens 40 can be appropriately mounted within the sleeve 11 to facilitate focusing the image upon the film plane 12.

It is also to be noted that since the zone 20 (or 20') is effectively darkened the particular configuration or curvature of this portion is relatively immaterial; and, if desired and for ease of fabrication, could essentially be flattened. The only critical requirement is that there by symmetry of the wall 13 around the axis 14 between the top of lens 10 (adjacent disc 15) and and zone 20 (or 20').

Various modifications to the disclosed embodiments, as well as alternate embodiments, may become apparent to one skilled in the art without departing from the spirit and scope of the invention as defined by the appended claims.

What is claimed is:

1. A method for operating a panoramic optical system of the type for recording images disposed substantially 360° around the system onto a film plane, said method comprising the steps:

(a) spacing the top of a curved lens from said film plane at a distance i, said lens having a base portion and a curved outer surface of light reflective material of diameter b and radius of curvature r between its top and base, said curved surface being symmetrical about an axis which extends transversely to the film plane, and an origin of curvature p located at a distance x with respect to said axis and at a distance y with respect to the top of said lens, the axis of said curved surface being substantially perpendicular to said film plane;

(b) enclosing the space between the base of said curved lens and said film plane with a sleeve, said sleeve having a transparent zone for enabling light rays from the outside of said sleeve to impinge upon the outer surface of said curved lens and an opaque zone contiguous with the transparent zone for preventing said light rays from impinging upon a predetermined area at the base portion of said lens; and, (c) positioning the border defined by the transparent/opaque zones of said sleeve at a distance h below the top of said lens wherein $h = r \sin(\alpha) - y$ where r = the radius of curvature of the curved surface 13 at the boundary of zone 20

$r_b = r \cos(\alpha) - x$ p = origin or curvature of the curved surface 13 at the boundary of zone 20 x, y = coordinates of p $$x = \frac{r_b y}{h}$$

-continued $$y = \left(x + \frac{b}{2}\right) \tan \beta$$

$\alpha = \text{arc tan } y/x$ $$\beta = \text{tilt angle} = \text{arc tan} \left(\frac{y}{x + \frac{b}{2}}\right)$$

b = diameter of reflector lens top surface
i = vertical distance from top of reflector lens to film plane 12.

* * * * *